Dec. 24, 1940.   H. NOVACK   2,226,253
REPLACEABLE FRICTIONALLY SUPPORTED BIRD'S NEST
Filed Oct. 26, 1939   2 Sheets-Sheet 1

HENRY NOVACK
*INVENTOR.*
BY Joseph Blacker
*ATTORNEY.*

Dec. 24, 1940.  H. NOVACK  2,226,253
REPLACEABLE FRICTIONALLY SUPPORTED BIRD'S NEST
Filed Oct. 26, 1939  2 Sheets-Sheet 2
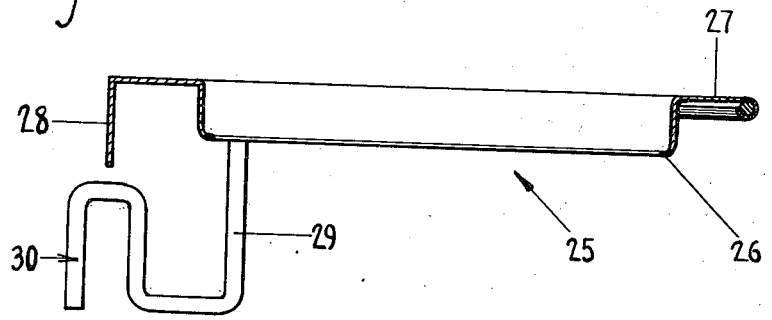
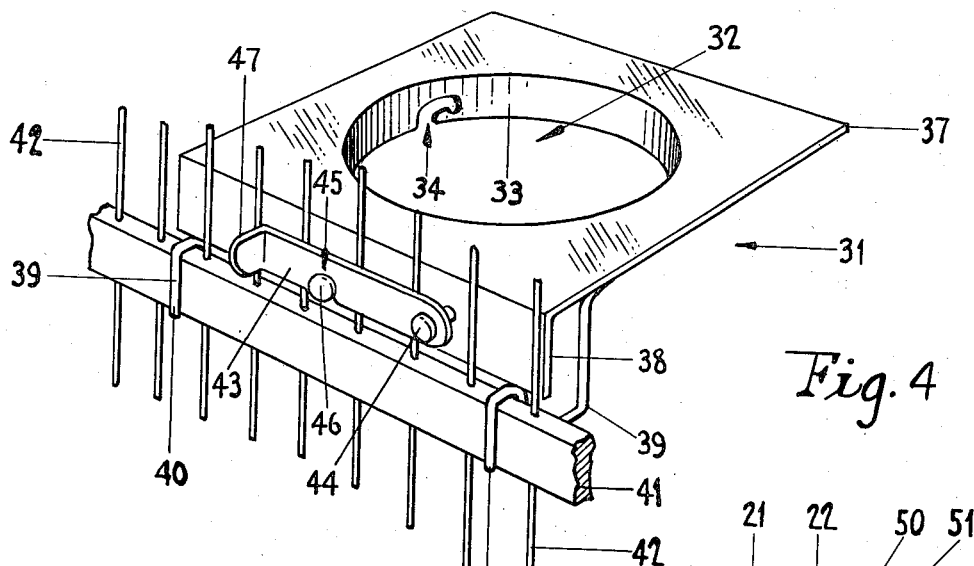
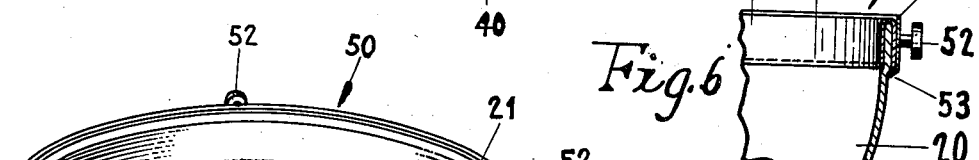
HENRY NOVACK
INVENTOR
BY Joseph Blacker
ATTORNEY Patented Dec. 24, 1940

2,226,253

UNITED STATES PATENT OFFICE 2,226,253

REPLACEABLE FRICTIONALLY SUPPORTED BIRD'S NEST

Henry Novack, Brooklyn, N. Y.

Application October 26, 1939, Serial No. 301,487

2 Claims. (Cl. 119—45)

This invention relates to a replaceable frictionally supported nest for bird cages designed to be used in the breeding of birds of various kinds, and particularly canaries.

An object of this invention is to provide a combination bird's nest having an adapter or supporting member permanently secured to a cage and having a nest body made of fibrous materials and manufactured at a low cost so that it may be easily removed when covered with excreta and thrown away, and a new nest body inserted in the adapter.

Another object of this invention is to provide a combination bird's nest having an adapter or supporting member permanently secured to a cage and having a nest body made of fibrous materials, the said nest body having a fabric binding secured to the upper edge portion thereof, the said binding being secured by tightly stitching the lower edge of the binding to the nest body whereby the binding above the stitched edge projects outwardly and forms a means for augmenting the frictional engagement between the nest body and the supporting member.

With the above and other objects in view, the invention will be hereinafter more particularly described, and the combination and arrangement of parts will be shown in the accompanying drawings and pointed out in the claims which form part of this specification.

Reference will now be had to the drawings, wherein like numerals of reference designate corresponding parts throughout the several views, in which:

Figure 3 is a cross-sectional view of a supporting member having a platform at its upper surface and designed for frictionally supporting a nest body therein.

Figure 4 is a perspective view of a modified platform type supporting member having apertures shaped like slots of bayonet joints for receiving the nest supporting adapter shown in Figure 5.

Figure 5 is a perspective view of a nest supporting adapter having studs which enter the slots shown in Figure 4 for engagement therewith and showing a nest body frictionally supported therein, the view being on an enlarged scale.

Figure 6 shows an enlarged fragmentary detail of the adapter and nest body shown in Figure 5.

Figure 2:
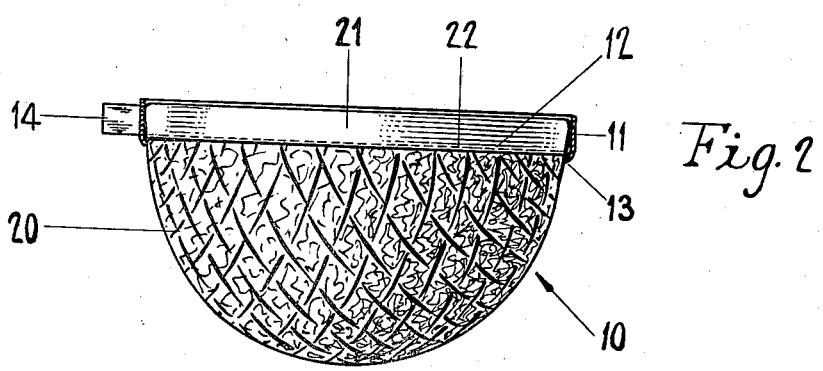
Figure 2 is a cross-sectional view, the section being taken as on line 2—2 in Figure 1, and showing the nest body frictionally supported therein.

In the illustrated embodiment of the invention the numeral 10 indicates a replaceable frictionally supported nest for bird cages comprising an adapter or supporting member 11 having an aperture 12 centrally thereof. As best shown in Figure 2, the aperture 12 is defined by a lateral flange 13 of annular form and which has been formed by extending the lower edge portion of the supporting member inwardly all around.

Figure 1:
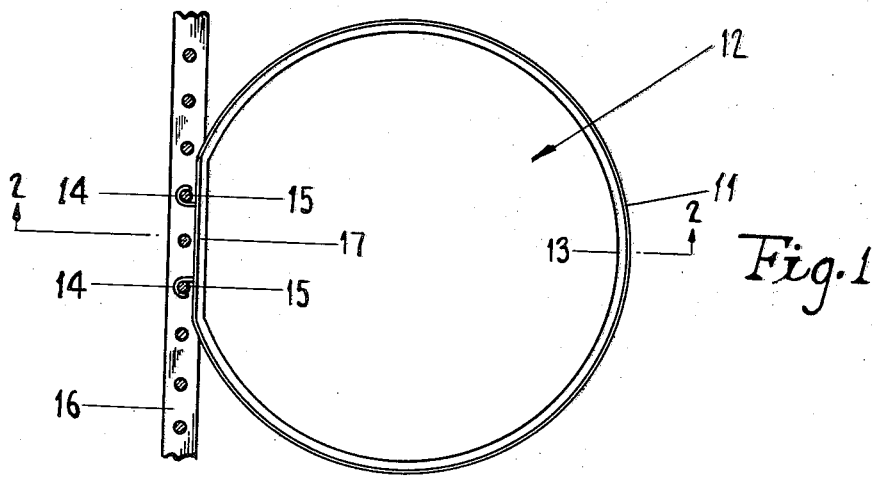
Figure 1 is a plan view of my supporting member installed in a bird cage by bending two tongues around two vertical bars of a cage.

As shown in Figures 1 and 2 the circular wall 15 of the supporting member 11 has two tongues 14, 14 pressed therefrom. As shown in Figure 1, the tongues 14 have been bent around two vertical bars 15, 15 extending from a horizontal rail 16 of a bird cage and serve to effectively hold the supporting member to the cage. The supporting member 11 may have a flattened portion 17 to facilitate alinement with the bars 15 of the cage.

As shown in Figure 2, a nest body 20 preferably comprising inner and outer layers of loosely felted fibrous materials held in unitary relation in any suitable manner has a ribbon-like covering 21 around its upper edge. The covering 21 is preferably of annular form and of U-shaped cross-section and is designed to entirely conceal the upper portion of the nest body and to partly conceal the inner and outer surfaces of the nest body at the upper edge of the nest body.

The nest body 20 is of semi-spherical form and of a size to permit entrance into the supporting member with the upper portion of the nest body frictionally retained by the flange 13 and so that it may be removed from the supporting member by a slight upward pressure against the bottom surface of the nest body.

The upper edge portion of the nest body 20 will preferably be covered with a fabric binding 21 which may be secured by stitching 22 while folded over the inner and outer faces of the nest body. The said fabric will preferably be of a washable nature so that excreta deposited on said covering fabric by the birds will be readily removable by washing. The ribbon-like fabric 21 may be secured solely to the upper edge portion of the outer surface of the nest body.

As shown in Figure 3, I have provided a modified supporting member or adapter 25 having a lateral flange 26 extending inwardly all around its lower edge and having a platform 27 at its upper edge. One edge of the platform 27 has been turned downwardly, forming a right-angular extension 28. Arms 29, having substantially U-shaped ends 30, have been integrally secured to the platform 27 below its lower surface. The arms extend outwardly beyond the right-angular extension 28 so as to be adapted for engagement with a rectangular rail of a bird cage and with the wall extension 28 in contact with one face of a wall of the cage.

As shown in Figure 4, I have provided a modified platform type supporting member 31 having an aperture 32 centrally thereof. The aperture 32 is defined by a vertical flange 33 of annular form. Apertures 34 shaped like slots of bayonet joints have been provided in diametrically opposite sides of the flange 33. The supporting member 31 has a platform 37 at its upper elevation and which is built with a right-angular extension 38 and with arms 39 having substantially U-shaped ends 40 similar to that shown in Figure 3. The arms extend outwardly beyond the right-angular extension 38 so as to be adapted for engagement with a rectangular rail 41 of a bird cage and with the wall extension 38 in contact with one face of a wall of the cage, the wall being made up of bars 42.

A latch 43 has been pivotally mounted on a headed pin 44 in the extension 38. The latch 43 has a substantially semi-circular opening 45 designed for engagement with a headed pin 46 in the extension 38. The latch may have a handle 47 angularly positioned in its free end.

It is to be noted that the latch 43 has been mounted in spaced parallel relation with the extension 38, the spacing being substantially the same as the thickness of the bars 42 of the cage. The modified platform type supporting member 31 may thus be mounted on the bird cage with the extension 38 in contact with one face of a wall of the cage and by rotating the latch on the opposite face of the wall, the platform and nest becomes securely locked to the cage.

As shown in Figure 5, I have provided an adapter 50 comprising an annular metallic member 51 of a height substantially greater than the height of the vertical flange 33 in the modified platform type supporting member 31. I have provided headed pins 52 secured to the metallic member 51 on diametrically opposite sides thereof and facing outwardly. The pins 52 are positioned so as to fit into the apertures 34 in the flange 33. The outer circumference of the adapter 50 is slightly smaller than the inner circumference of the vertical flange 33 so as to readily enter therein.

As best shown in Figure 6, the lower edge of the member 51 has been extended inwardly all around to form a lateral flange 53 of considerable surface area and so that when a nest body 20 is inserted into the adapter 50, the nest body will be retained and supported by the adapter. It is to be noted that the lower edge of the ribbon-like fabric 21 is stitched tightly by the line of stitching 22 and causes the fabric above the stitched edge to project outwardly of the nest body into engagement with the flange 53. This interengaging of the nest body and the adapter augments the frictional grip by which the nest body is supported.

The user may grip the nest 20 and the lower edge portion of the adapter 50 and mount the nest 20 and the adapter 50 inside the flange 33, with the headed pins 52 inside the bayonet slots 34, and by partial rotation of the said pins in the said slots, cause the nest 20 and adapter 50 to be secured in unitary relation with the platform type supporting member 31.

The importance of the easily detachable bayonet connection is that it makes possible for the breeder to quickly remove the nest body only from the cage when transferring eggs deposited therein, and replacing with artificial eggs, with the viewpoint of having all the eggs hatched on the same date. This transfer is accomplished without disturbing the supporting member 11 or 31. In prior practice, it was necessary for the breeder to insert his hand into the nest to remove the natural eggs and replace them with artificial eggs. In many instances the natural eggs were destroyed during such removal.

It is to be noted that the latch 43 when in locked position to the bars of the cage prevents vibration and holds the platform-nest firmly when the bird hops into and out of the nest. This non-vibratable feature serves a very useful purpose in the hatching of canary eggs, as experience has shown that continuous vibration of a nest containing eggs to be hatched destroys life in the eggs.

In accordance with the patent statutes I have described and illustrated the preferred embodiments of my invention, but it will be understood that various changes and modifications can be made therein without departing from the spirit of the invention as defined by the appended claims.

I claim:

1. In a bird's nest for bird cages having bars and rails, comprising a semi-spherical nest body of fibrous material, a supporting member defined by an annular periphery, the lower edge of said supporting member extending inwardly all around and forming a flange inside said member for gripping said nest body frictionally, said nest body having a ribbon-like fabric strip secured to its rim edge portion, the lower edge of said ribbon-like fabric strip being tightly stitched to cause the fabric above the stitched edge to project outwardly into engagement with said flange for augmenting said frictional engagement, and means on said supporting member for securing same in connection with said bird cage bars, said supporting member covering only the upper portion of said nest body whereby said nest body may be removed from said supporting member by a slight upward pressure against the bottom surface of said nest body.

2. In a bird's nest for bird cages having bars and rails, comprising a semi-spherical nest body of fibrous material, a supporting member defined by an annular periphery, the lower edge of said supporting member extending inwardly all around and forming a flange inside said member for gripping said nest body frictionally, said nest body having a ribbon-like fabric strip secured to its rim edge portion, the lower edge of said ribbon-like fabric strip being tightly secured to said nest body to cause the fabric above said edge to project outwardly into engagement with said flange for augmenting said frictional engagement, and means cooperating with said supporting member for securing same in connection with said bird cage, said supporting member covering only the upper portion of said nest body whereby said nest body may be removed from said supporting member by a slight upward pressure against the bottom surface of said nest body.

HENRY NOVACK.